(12) United States Patent
Cheng

(10) Patent No.: US 6,244,990 B1
(45) Date of Patent: Jun. 12, 2001

(54) MAGNETIC DAMPING DEVICE FOR AN EXERCISING MACHINE

(76) Inventor: Tong-Sheng Cheng, 7F-2, 35, Lane 105, Tien Mu E. Road, Taipei (TW)

( * ) Notice: Subject to any disclaimer, the term of this patent is extended or adjusted under 35 U.S.C. 154(b) by 0 days.

(21) Appl. No.: 09/657,570

(22) Filed: Sep. 8, 2000

(51) Int. Cl.[7] ................. A63B 22/06; B60L 7/00
(52) U.S. Cl. ........................... 482/63; 188/164
(58) Field of Search ................. 482/63, 57, 903, 482/5, 6; 188/164, 161, 163, 267; 310/93, 105, 153; 123/697

(56) References Cited

U.S. PATENT DOCUMENTS

| | | | | |
|---|---|---|---|---|
| 5,031,901 | * | 7/1991 | Saarinen | 482/63 |
| 5,848,953 | * | 12/1998 | Wei et al. | 482/63 |
| 5,851,165 | * | 12/1998 | Wei et al. | 482/63 |
| 6,095,953 | * | 8/2000 | Lee et al. | 482/63 |

* cited by examiner

Primary Examiner—S. Crow
(74) Attorney, Agent, or Firm—Dougherty & Troxell

(57) ABSTRACT

A magnetic damping device installed in an exercising machine and controlled to impart a magnetic damping force to a load wheel, including two magnetic members symmetrically pivoted to the exercising machine and moved one after the other with an adjustment device relative to the load wheel, and two tensile springs respectively connected between the exercising machine and the magnetic members to provide the magnetic members with different moment of force.

1 Claim, 6 Drawing Sheets

MAGNETIC DAMPING DEVICE FOR AN EXERCISING MACHINE

BACKGROUND OF THE INVENTION

The present invention relates to a magnetic damping device for an exercising machine, and more particularly to such a magnetic damping device, which includes two magnetic members that can be adjusted one after the other to control the magnetic damping force to the load wheel of the exercising machine.

The magnetic damping device of a regular exercising machine is comprised of a magnetic member disposed adjacent to a load wheel at one side. The magnetic member is moved relative to the load wheel by an adjustment device to control its magnetic damping force to the load wheel. Because the magnetic member Because only one magnetic member is provided at one side relative to the load wheel, the magnetic damping force adjusting range is limited.

SUMMARY OF THE INVENTION

The present invention provides a magnetic damping device for an exercising machine, which enables the user to adjust the magnetic damping force. According to the present invention, the magnetic damping device comprises two magnetic members, the magnetic members each having a fixed end pivoted to the exercising machine and a free end coupled to a different movable part of an adjustment device, and two tensile springs respectively connected between the exercising machine and the magnetic members to provide the magnetic members with different moment of force. When adjusting the adjustment device, the magnetic members are moved relative to the load wheel one after another, enabling the magnetic damping force to be precisely adjusted to the desired level.

DETAILED DESCRIPTION OF THE PREFERRED EMBODIMENT

Figure 1:
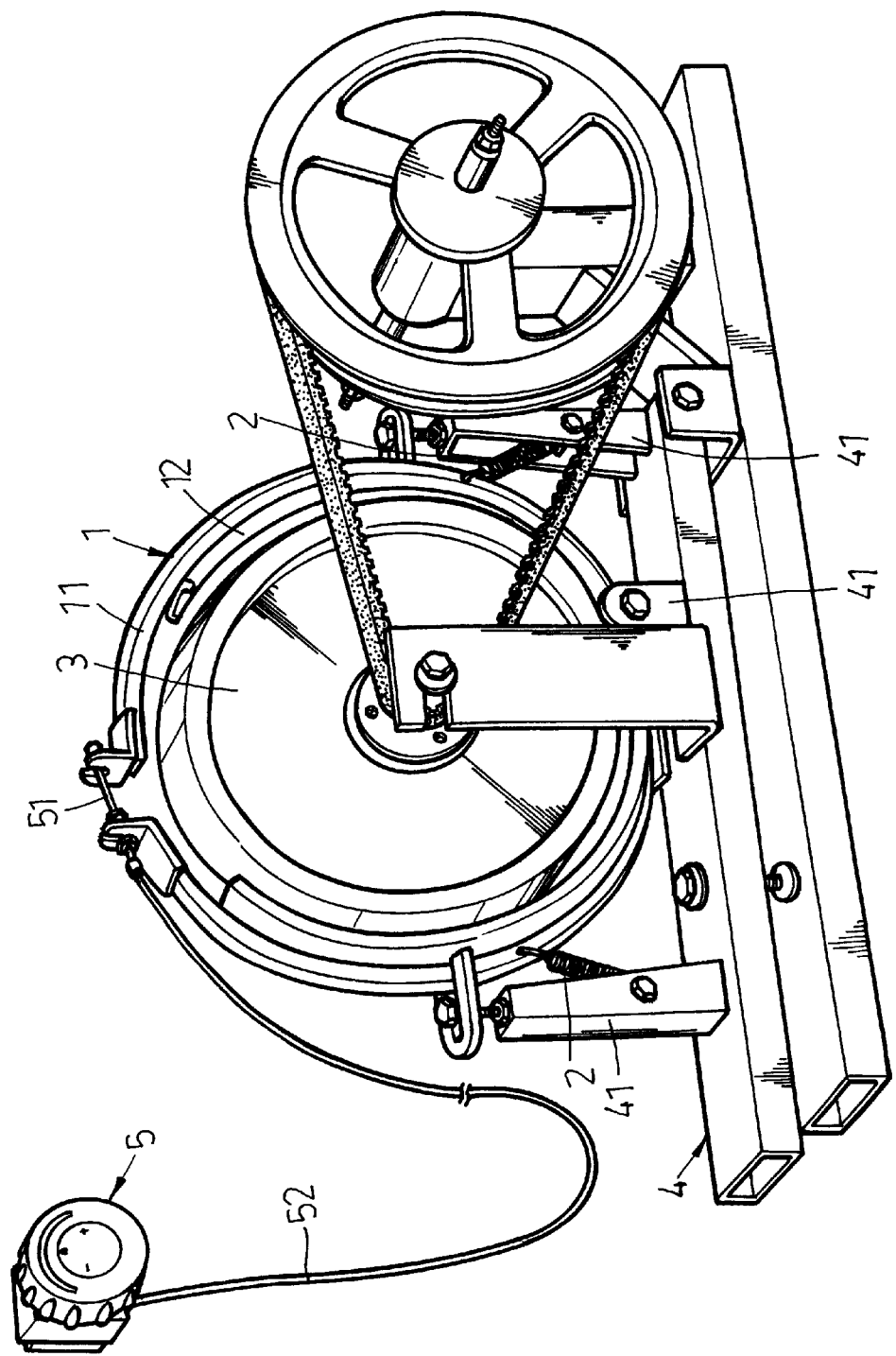
FIG. 1 is a perspective view of the present invention, showing the magnetic damping device installed in an exercising machine and connected to an adjustment device.
Figure 2:
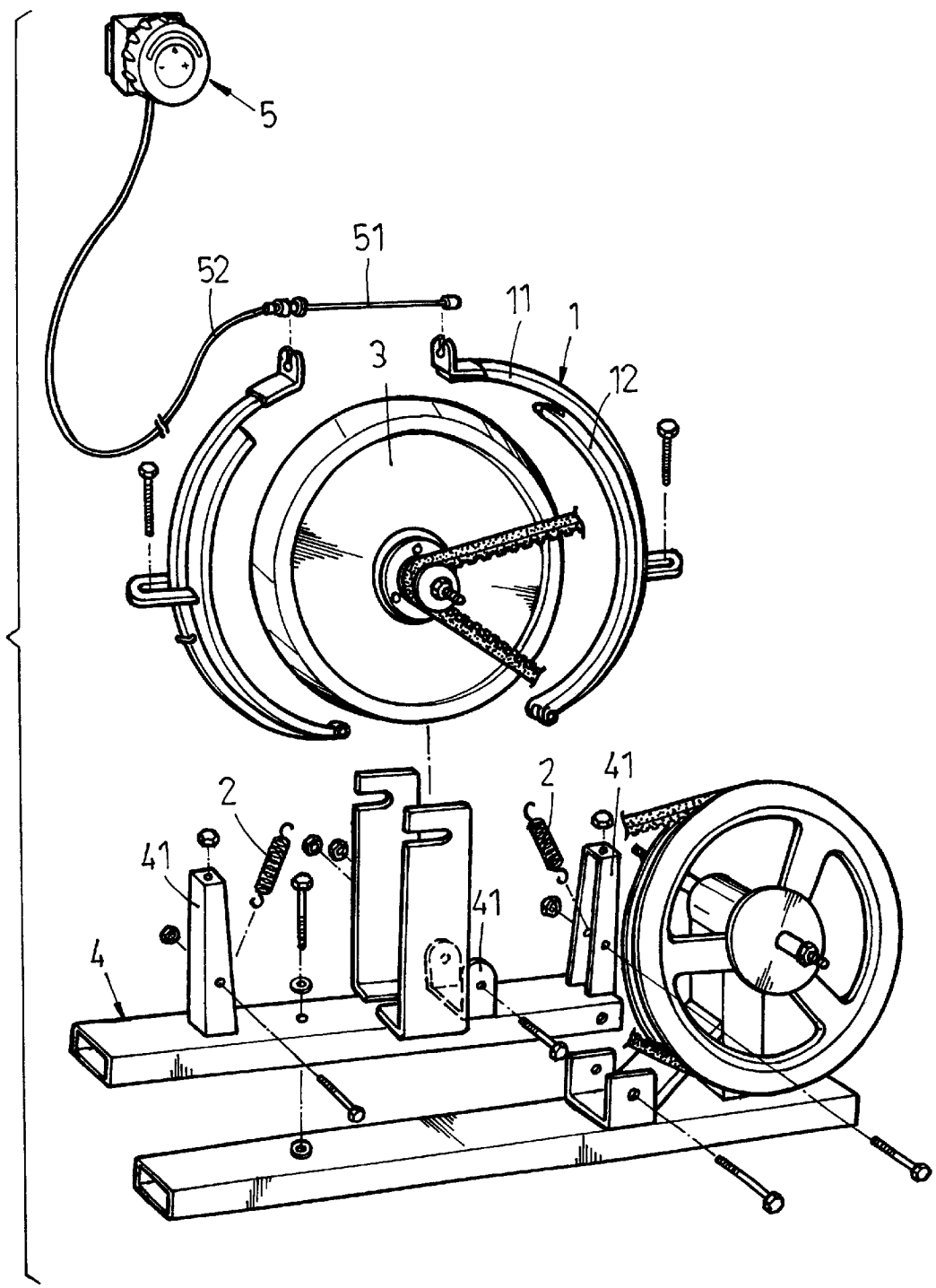
FIG. 2 is an exploded view of FIG. 1.
Figure 3:
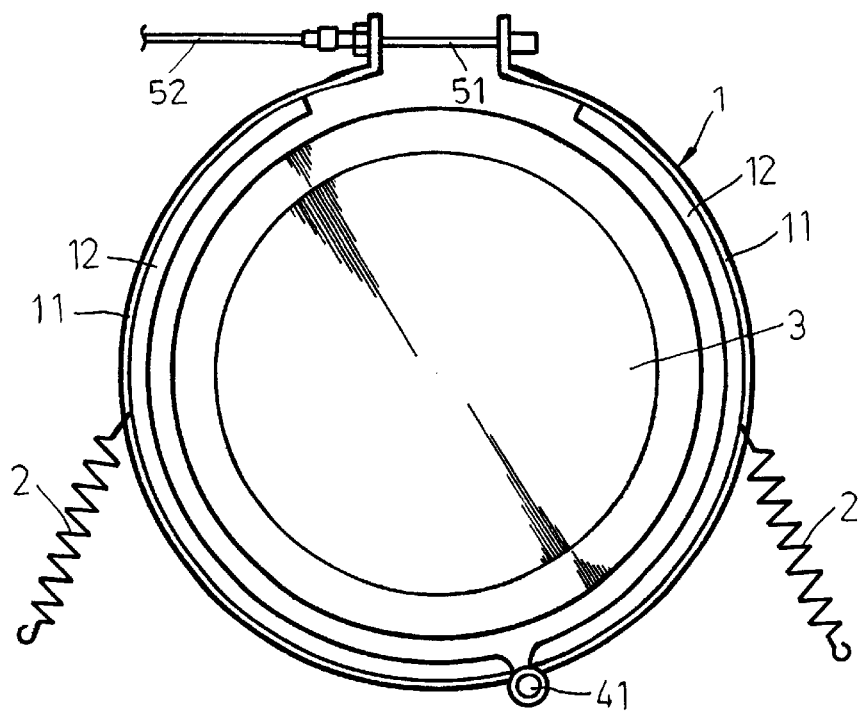
FIG. 3 is a side plain view of the magnetic damping device according to the present invention.

Referring to FIGS. from 1 through 3, a magnetic damping device according to the present invention is mounted on a support structure 41 in an exercising machine 4 around a load wheel 3.

The aforesaid magnetic damping device comprises two magnetic members 1, and two tensile springs 2. The magnetic members 1 are symmetrically disposed around the periphery of the load wheel 3 at two opposite sides, each comprised of a smoothly arched holder strip 11, and a smoothly arched magnetic element 12 fastened to the smoothly arched holder strip 11. The smoothly arched holder strip 11 has its one end, namely, the top end axially movably coupled to the support structure 41, and its other end, namely, the bottom end connected to an adjustment device 5. The adjustment device 5 comprises a steel cable 51 connected to one end of the smoothly arched holder strip 11 of one magnetic member 1, and a sleeve 52 sleeved onto the steel cable 51 and fastened to one end of the smoothly arched holder strip 11 of the other magnetic member 1. The tensile springs 2 each have one end fastened to the support structure 41 of the exercising machine, and an opposite end respectively connected to the magnetic members 1. The tensile springs 2 are respectively connected to the smoothly arched holder strips 11 of the magnetic members 1 at different elevations such that the tensile springs 2 provide different moment of force to the magnetic members 1.

Figure 4:
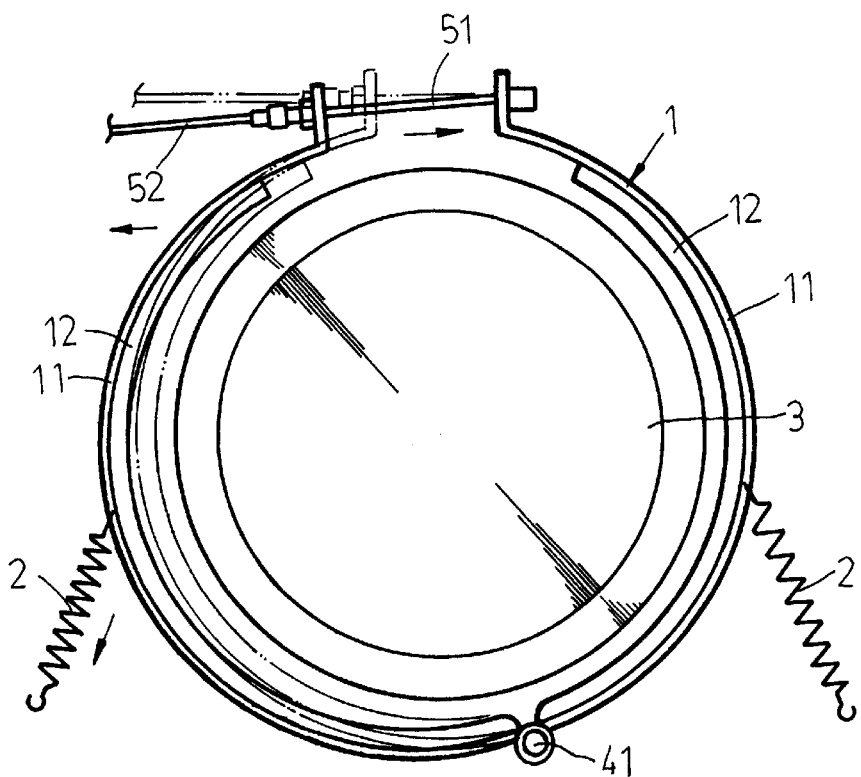
FIG. 4 is a schematic drawing showing the left-sided tensile spring released, the left-sided magnetic member pulled outwards according to the present invention.
Figure 5:
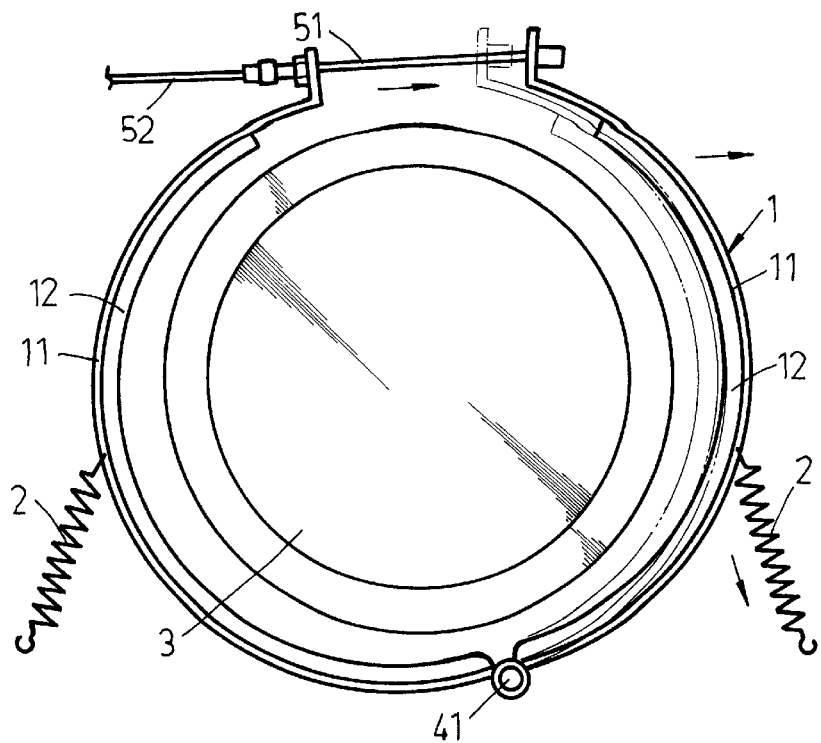
FIG. 5 is a schematic drawing showing the right-sided magnetic member pulled outwards after adjustment of the left-sided magnetic member according to the present invention.

Referring to FIGS. 4 and 5, when loosening the adjustment device 5, the left-sided magnetic member 1 is stretched open at first to release the left-sided tensile spring 2, and then the right-sided magnetic member 1 is pulled outwards by the right-sided tensile spring 2 after the moment of force of the left-sided magnetic member 1 has become smaller than the right-sided magnetic member 1, and thus the magnetic damping force to the load wheel 3 is relatively reduced.

Figure 6:
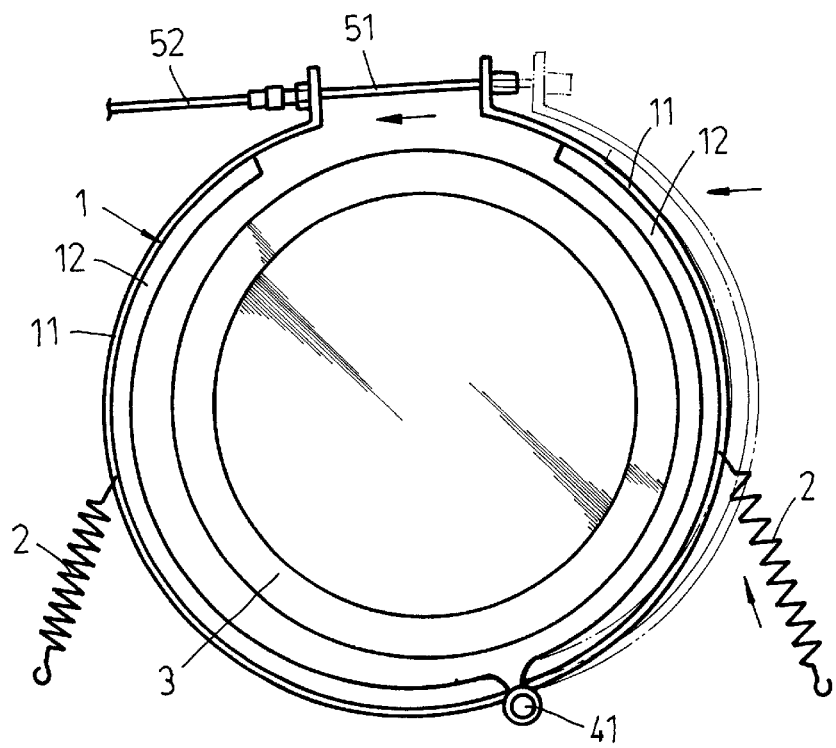
FIG. 6 is a schematic drawing showing the right-sided tensile spring stretched, the right-sided magnetic member pulled inwards according to the present invention.
Figure 7:
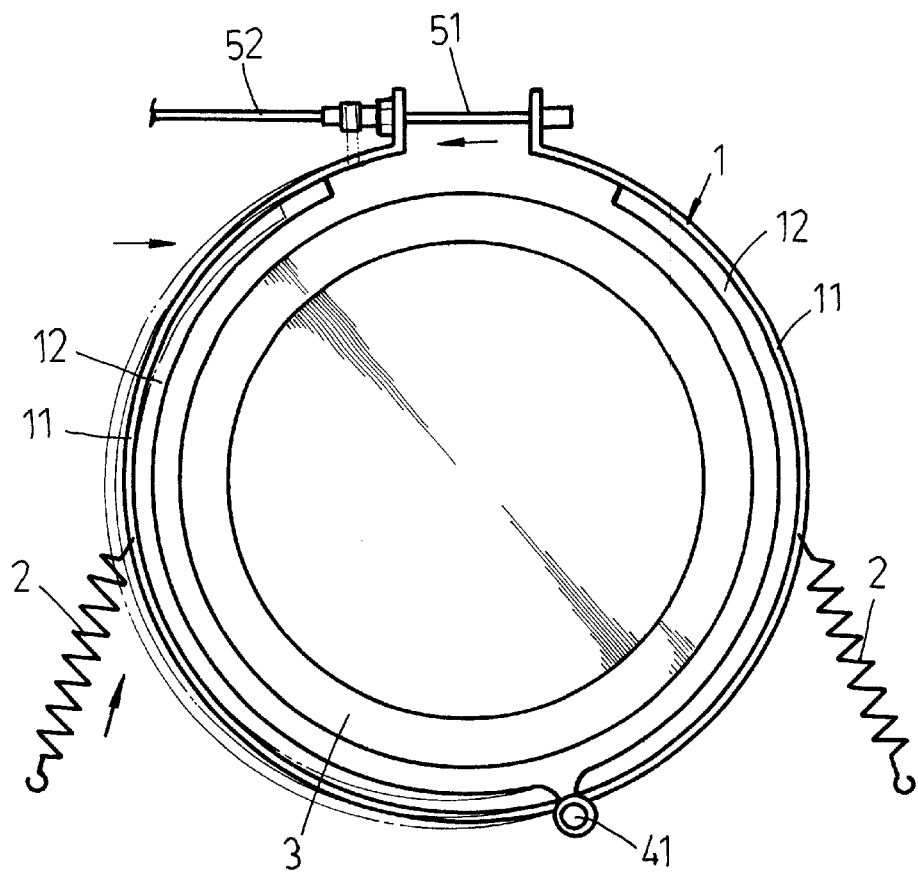
FIG. 7 is a schematic drawing showing the left-sided magnetic member pulled inwards and the left-sided tensile spring stretched after adjustment of the right-sided magnetic member.

Referring to FIGS. 6 and 7, tightening the adjustment device 5, the right-sided magnetic member 1 is pulled inwards to stretch the right-sided tensile spring 2, and then the left-sided magnetic member 1 is pulled inwards to stretch the left-sided tensile spring 2, and thus the magnetic damping force to the load wheel 3 is relatively increased.

Figure 8:
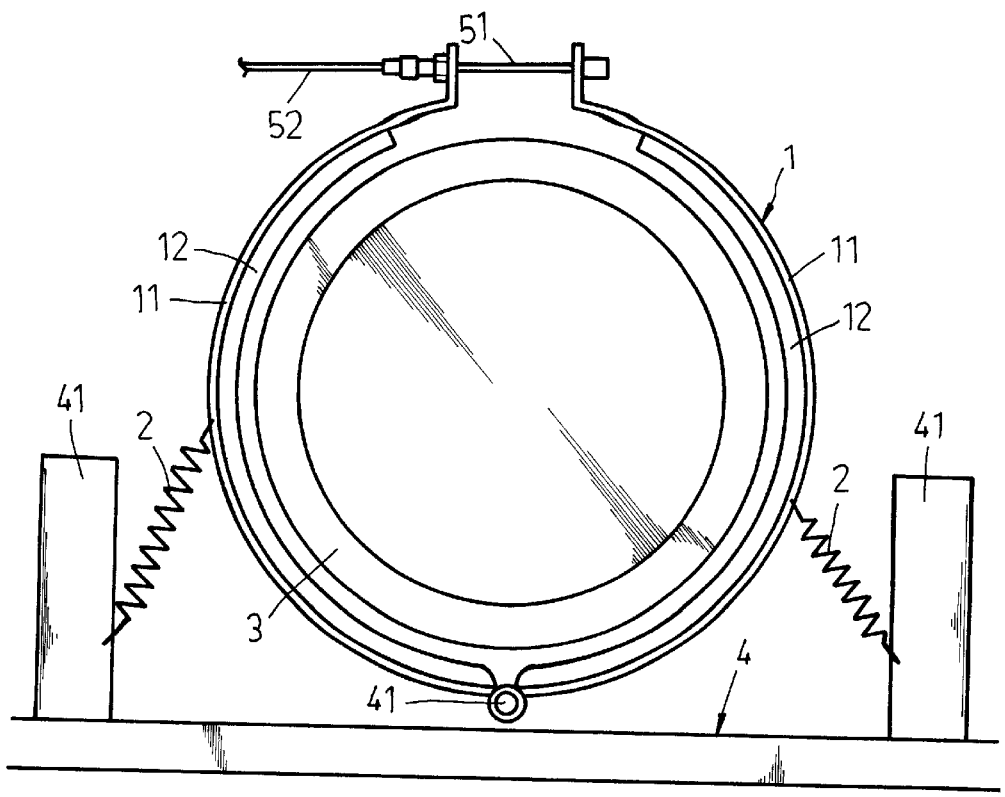
FIG. 8 shows another installation example of the present invention.
Figure 9:
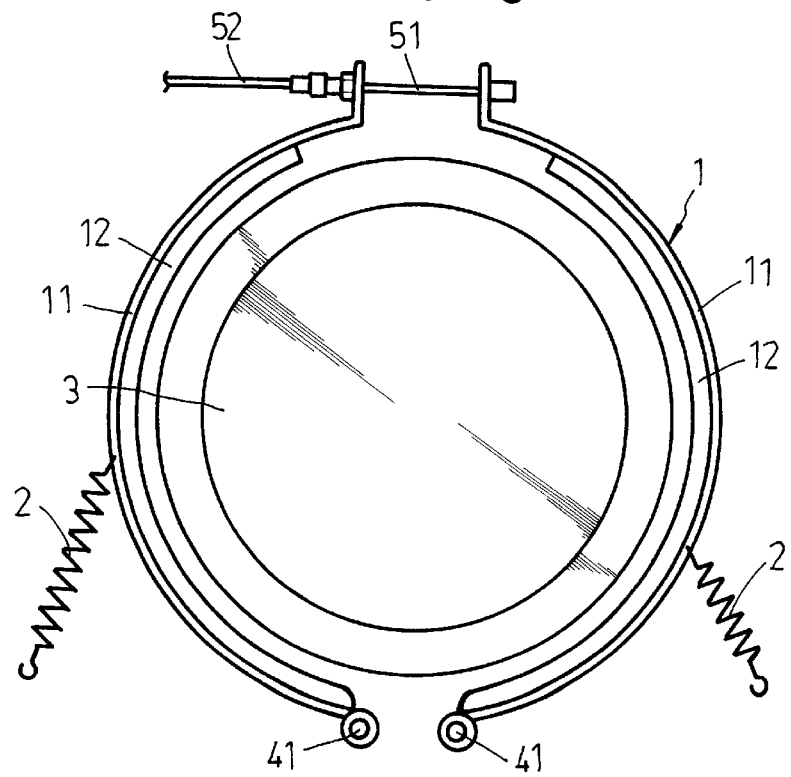
FIG. 9 shows still another installation example of the present invention.

In order to let the magnetic members 1 have different moment of force, the magnetic members 1 are eccentrically pivoted to the support structure 41 of the exercising machine 4. In FIG. 8, the magnetic members 1 are symmetrically pivoted to a common pivot at the support structure 41, and the tensile springs 2 are respectively connected to the smoothly arched holder strips 11 of the magnetic members 1 at different elevations. In FIG. 9, the magnetic members 1 are pivoted to different locations at the support structure 41, and the tensile springs 2 are respectively connected to the smoothly arched holder strips 11 of the magnetic members 1 at different elevations.

As indicated above, one magnetic member of the magnetic damping device is opened and then closed during the adjustment of the adjustment device while the other magnetic member is closed and then opened, thus the magnetic damping force to the load wheel can be adjusted at two stages precisely.

What the invention claimed is:

1. A magnetic damping device installed in a support structure in an exercising machine and adjusted by an adjustment device having a steel cable and a sleeve on the steel cable to impart a magnetic damping force to a load wheel in said exercising machine, comprising:

two magnetic members respectively pivoted to the support structure of said exercising machine around the periphery of said load wheel at two opposite sides, said magnetic members each comprising a smoothly arched holder strip, and a magnetic element fastened to said holder strip and facing the periphery of said load wheel, said smoothly arched holder strip each having a bottom end pivoted to the support structure of said exercising machine and a top end, the top end of the smoothly arched holder strip of one of said magnetic members being connected to said steel cable, the top end of the smoothly arched holder strip of the other of said magnetic members being connected to said sleeve; and two tensile springs respectively connected between said support structure and the smoothly arched holder strips of said magnetic members to impart different moment of force to said magnetic members for enabling said magnetic members to be stretched open one after the other when said adjustment device is adjusted in one direction, or to be pulled inwards toward the periphery of said load wheel one after the other when said adjustment device is adjusted in the reversed direction.

* * * * *